March 15, 1955

M. E. CUSHMAN 2,704,129

BLADE RETENTION FOR AIRCRAFT PROPELLER

Filed March 23, 1951

INVENTOR
MAURICE E. CUSHMAN
BY
*Godfrey B. Lein*
ATTORNEY

March 15, 1955   M. E. CUSHMAN   2,704,129
BLADE RETENTION FOR AIRCRAFT PROPELLER
Filed March 23, 1951   2 Sheets-Sheet 2

INVENTOR
MAURICE E. CUSHMAN
BY
/ATTORNEY

United States Patent Office 2,704,129
Patented Mar. 15, 1955

2,704,129

BLADE RETENTION FOR AIRCRAFT PROPELLER

Maurice E. Cushman, Verona, N. J., assignor to Curtiss-Wright Corporation, a corporation of Delaware Application March 23, 1951, Serial No. 217,198

4 Claims. (Cl. 170—160.58)

This invention relates to anti-friction bearings, and is particularly concerned with the provision of a multi-part thrust bearing and its embracing structure, for utilization particularly in connection with aeronautical controllable pitch propellers.

In aeronautical propellers, a portion of the propeller assembly usually comprises a hub having blade sockets extending radially therefrom, and propeller blades having shanks which enter into the sockets and are secured thereto by suitable bearing means to constrain the propeller blade against outward movement under the influence of centrifugal force. The blade retention and bearing, in modern aircraft propellers, must enable the blade to be turned substantially about its own axis or about the socket axis, so that changes in the pitch of the propeller blade may be accomplished during operation. Bearing constructions for this purpose have taken numerous forms of which the following types predominate in practical propellers:

In one well known type of propeller, the propeller hub and sockets are an integral structure, and the blade sockets are threaded at their outer ends to receive an internal nut. The blade shank, with either an integral or a separate external flange thereon is assembled in the socket, anti-friction bearings are assembled within the socket and around the shank and the internal nut is screwed into the socket to hold the parts in assembled relation and to assume the radial centrifugal force from the blade. Another form of retention has taken the shape of a split hub member having integral internally facing socket flanges along with integral flanges on the blades. The bearing is assembled around the blade and the two socket portions are assembled around the bearing, the socket or hub portions then being secured together. Another form of retention has taken the form of blades and socket elements, each having hardened ball races formed therein. After sleeving the shank into the socket, the bearing balls are fed into the ball races, to secure the blade to the socket, through holes passing through the walls of the hub sockets.

The above briefly described bearing retentions along with others in the prior art have certain disadvantages from the standpoint of weight, bulk or fabrication difficulties and it is an object of this invention to overcome the shortcomings in prior types of blade retentions.

In the present invention, a bearing arrangement may be assembled between an integrally flanged blade shank after its assembly into an integrally flanged unitary hub socket through the space existing between the hub socket flange and the blade shank, after which the bearing elements may be brought together in operative relation and held in the operative relation by an adjustable preload bearing.

An example of the invention is shown in the annexed drawing and is described in detail in the following specification, but this example is only to be construed as exemplary of the principles of my invention and its scope is only to be measured by the terms of the appended claims.

In the drawings, in which similar reference characters refer to similar parts,

Figure 1:
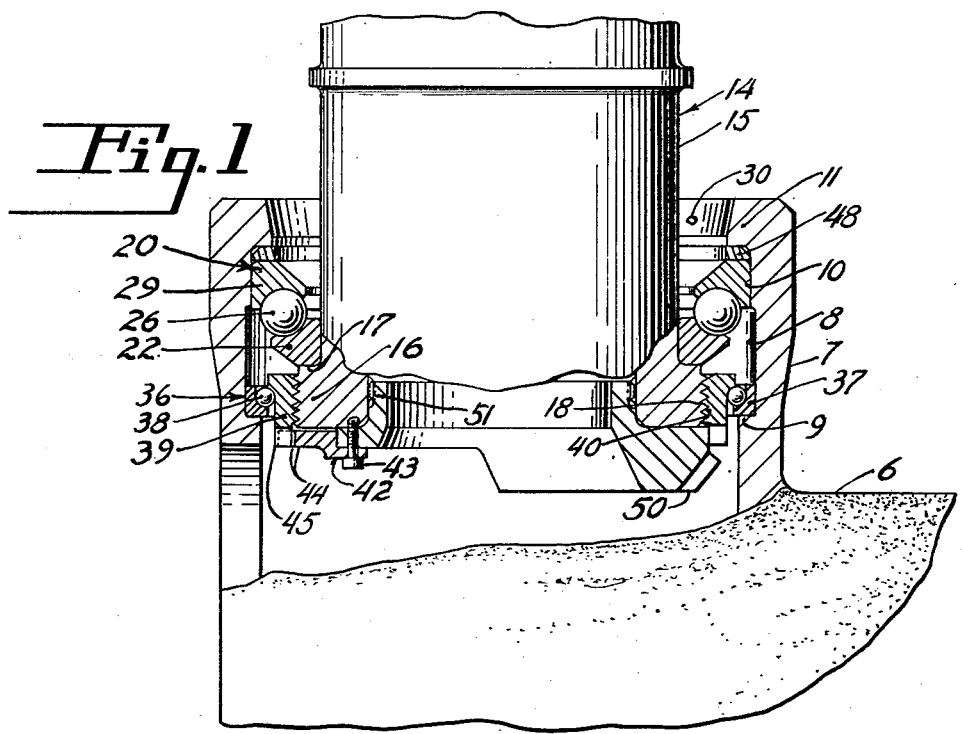
Fig. 1 is a fragmentary longitudinal section through a propeller hub incorporating the provisions of the invention.

While a propeller provides an appropriate environment for the provisions of this invention, and has been selected for purpose of illustrating the invention, the principles may be utilized in other environments as will be clear to those versed in the art.

In the figures, 6 represents a propeller hub having one or more integral blade sockets 7 thereon. Each blade socket is provided with a bore 8 terminating in a lower shoulder 9, and a bore 10 terminated at its outer end by an integral inturned flange 11. It is to be noted that the blade socket itself is an integral component having no partings or splittings throughout its periphery.

A propeller blade 14 having a shank portion 15 is disposed within the socket 7 and is provided at its innermost end with an integral annular flange 16 provided with an abutment 17 and with screw threads 18 around its periphery.

A bearing arrangement 20 is disposed between the flanges 11 and 16 and between the interior bore 10 of the hub socket and the exterior surface of the shank 15, this bearing holding the blade against outward movement from the socket under the influence of forces such as centrifugal force in a propeller, which would tend to move the blade upwardly as shown in Fig. 1 with respect to the propeller hub. The races of the bearing 20 are disposed to assume both centrifugal and radial loading.

It will be noted that the solid or integral flanges 11 and 16 would inhibit the assembly of an appropriate integral annular bearing 20 and part of the present invention is concerned with the detailed construction of a bearing which may be assembled in its proper location.

Figure 2:
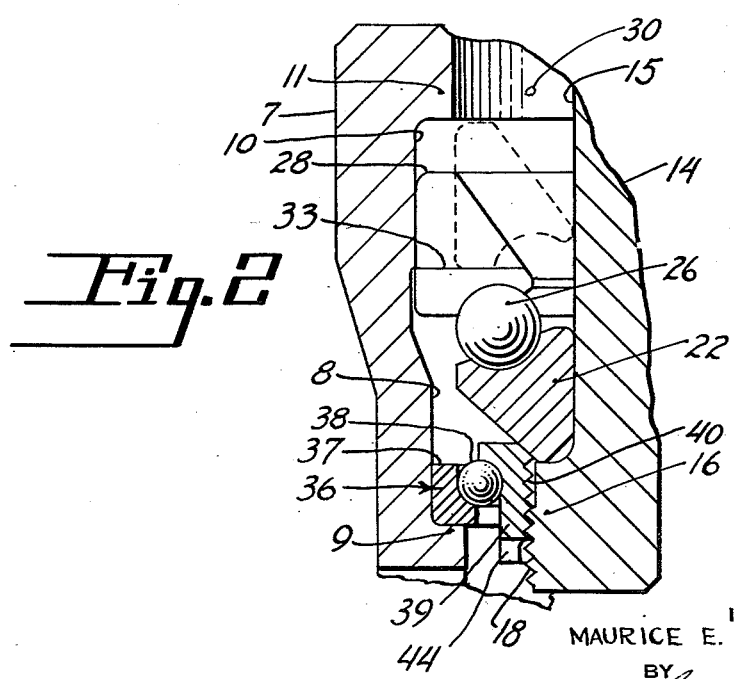
Fig. 2 is an enlarged fragmentary section showing the socket and blade in a position to enable assembly of the components.
Figure 3:
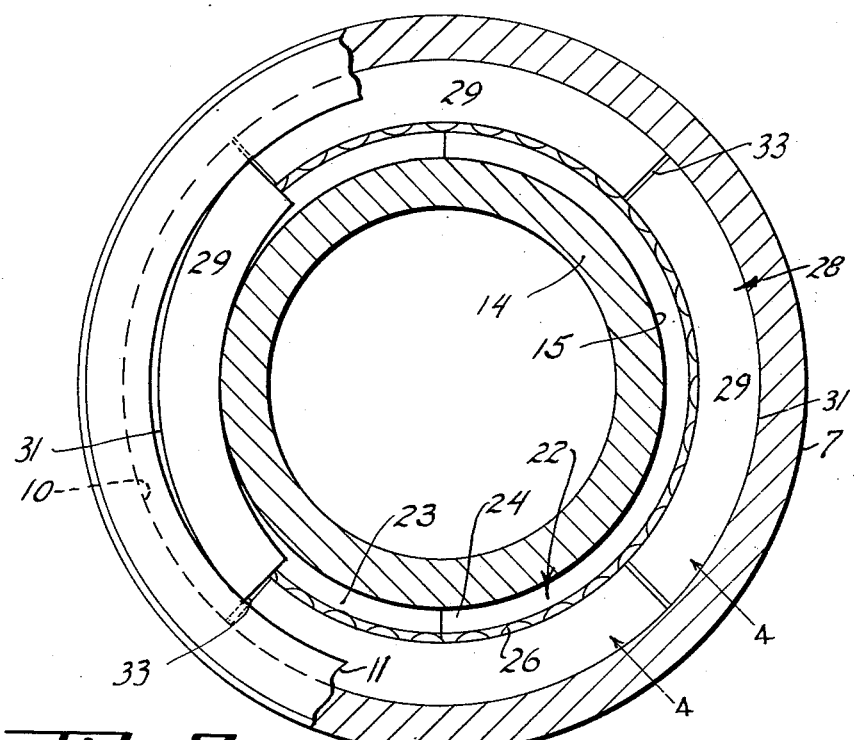
Fig. 3 is an end section through a portion of the blade and socket.
Figure 4:
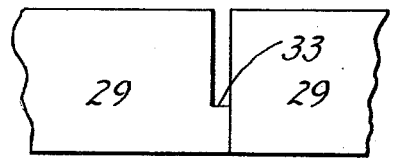
Fig. 4 is an enlarged section taken on the line 4—4 of Fig. 3.

The bearing 20 comprises an inner race 22 having at least two segmental portions 23 and 24 which are assembled around the blade shank 15 before the shank is inserted in the hub socket. The external diameter of the race 22 is slightly less than the internal diameter of the inturned flange 11 to permit the indicated insertion. After insertion of the shank into the socket with the race 22, a plurality of bearing balls 26 are assembled in the ball groove of the race 22 through the space between the shank 15 and the flange 11, these balls being set as desired in a yieldable retainer to hold the balls in properly spaced relation with respect to each other. The blade is inserted deep into the socket, deeper than after assembly of the bearing has been completed, as shown in Fig. 2. Now, a multi-part outer bearing race 28 is assembled in the socket. The race 28 comprises a plurality—preferably four—similar race segments 29 whose length, and internal and external diameters are such as to permit of their individual assembly in the socket through the clearance space 30 between the shank 15 and the innermost edge of the flange 11. At the left hand side of Fig. 3, a segment 29 is shown between the shank and flange 11 wherefrom it may be pressed downwardly toward the balls 26 after which it is pressed outwardly so that the outer surface 31 of the race segment engages with the wall 10 of the blade socket and then downwardly to engage the bearing balls. To provide space for assembly of the segments, the ends of the race segments 29 are step-cut as at 33 as shown in Figs. 2 and 4. The steps 33 provide shelves on the ends of the initially inserted segments against which the bottoms of adjacent later-inserted segments may rest after their uppermost portions have passed below the socket flange 11.

The specific assembly steps for the bearing are as follows: After inserting the blade into the socket and assembling the races 22 and balls 26, the upper and lower segments 29 (Fig. 3) are pressed downwardly, outwardly, and again downwardly between the socket and blade shank to engage the balls 26. Then the right hand segment 29 is inserted between the shank and socket, pushed outwardly below the flange 11, and downwardly so that the ends of segment rest on the steps 33 of the upper and lower segments, these having been moved around so that their steps 33 support the right hand segment. This also allows a relatively wide space at the left for inserting the last segment. Then the left hand segment is inserted, and is pushed down to rest on the left-end steps 33 of the upper and lower segments, after which the left segment 29 is pushed out to contact the socket wall 10. Now, the left segment 29 clears the ends of the upper and lower segments and may be seated downwardly against the balls 26. The upper and lower segments are then shifted leftwardly to give the clearance needed for the right segment to move down and seat against the balls 26. This arrangement is preferred to minimize the lateral depth of the steps 33, avoiding an extended unsupported portion at the ends of the ball races. When assembled, the ball races are substantially continuous circumferentially.

After the complete insertion of the components of bearing 20 as described above, the blade 14 may be pulled upwardly so that the uppermost surfaces of the bearing race 28 engage the shoulder formed on the inside of the flange 11, whereupon the bearing is in operative position.

Means are desirable to hold the bearing 20 in operative position and to preload said bearing slightly so that the blade in the assembled propeller will have no tilting freedom in the bearing when the propeller is not being rotated under power. For the purpose of this preloading and to assist in assembly of the components, a preload bearing 36 (Figs. 1 and 2) is incorporated. This bearing includes an outer race 37 preferably formed in three segments and inserted into the hub socket 7 prior to blade assembly. The race 37 engages the bore 8 in the socket and also the shoulder 9 formed within the socket. The bearing 36 further comprises a string of bearing balls, preferably held in an elastic retainer, which are assembled in the ball groove of the race 37. The bearing 36 further comprises an inner annular race 39 having an exterior ball groove for engagement with the balls 38 and an internal threaded bore 40 so that the race may be screwed upon the threaded portion 18 on the blade shank flange 16.

Prior to assembly of the bearing 20, the shank 14 is assembled in the socket 10 with the bearing 36, the shank being screwed downwardly into the ball race 39 to the position shown in Fig. 2 where a considerable axial gap exists between the socket flange 11 and the blade flange 16. This permits assembly of the bearing 20 as previously described. After assembly of the bearing 20, the blade shank 14 is screwed upwardly in the threaded race 39 until the bearing assembly 20 is firmly preloaded against the bearing 36, the two bearings working in opposition to one another.

After complete assembly of the blade, bearings and socket, the preload bearing race 39 is locked against rotation relative to the blade shank 14 by a locking lug 42 screwed as at 43 to the blade shank and having a dog 44 engaged with castellations 45 formed on the lower end of the preload bearing race 39.

To lessen the amount of axial movement necessary between the screw joint 18, 40, shims 48 (Fig. 1) may be inserted between the top of the bearing race segments 29 and the bottom of the flange 11, these shims comprising segments to enable their proper insertion. With these shims in place, the outward movement of the blade afforded by screwing of the blade shank outwardly in the preload bearing race 39 is reduced to some extent.

The blade shank is provided with some suitable means to enable turning of the blade in the socket for blade pitch adjustment. Such a means, by way of example, is illustrated in Fig. 1 and comprises a bevel gear 50 splined at 51 to the blade shank and secured thereto by the screws 43 which likewise secure the locking lug 42. The gear 50 is engaged by a suitable driving gear, not shown, but which is well known in the art.

The features of the invention previously described may be altered considerably from a dimensional standpoint. Greater facility of bearing assembly in some designs, for the insertion of the split bearing races, may be obtained by tilting the blade shank in the socket to yield more clearance between the shank and socket flange. Then, after assembly of the bearing segments, the axes of the blade and socket are aligned to enable final takeup and adjustment of the bearing.

While the bearing races shown herein are split into several segments, this splitting does not reduce available bearing race area or continuity since when in full assembled relationship, continuous race annuli are provided. Bearing loads are transmitted to the solid integral flange structures of the blade and of the hub socket so that maximum strength for the assembly is provided with minimum bulk and weight.

Though but a single embodiment illustrating the invention has been shown and described, it is to be understood that the invention may be applied in other and various forms. Changes may be made in the arrangements, without departing from the spirit of the invention. Reference should be had to the appended claims for definitions of the limits of the invention.

What is claimed is:

1. A propeller blade bearing and retention assembly comprising a blade socket having an inturned integral flange toward its outer end, a blade having an integral flange of a size to enter said socket through the socket flange, a multipart anti-friction bearing having each of its parts assembled between the blade and socket through the annulus defined between the socket flange and the blade shank, preloading means adjustable after assembly of said bearing to preload the bearing and to hold the bearing, socket and blade in assembled relation, said bearing comprising inner and outer segmentally divided races respectively engaging said shank and socket flanges, rollers between said races, and said preloading means comprising a ball bearing having an outer race engaging the inner wall of said socket and an inner race having screw-thread engagement with a portion of the propeller blade shank.

2. A propeller blade bearing and retention assembly comprising a blade socket having an inturned integral flange toward its outer end, a blade having an integral flange of a size to enter said socket through the socket flange, a multipart anti-friction bearing having each of its parts assembled between the blade and socket through the annulus defined between the socket flange and the blade shank, preloading means adjustable after assembly of said bearing to preload the bearing and to hold the bearing, socket and blade in assembled relation, said bearing comprising inner and outer segmentally divided races respectively engaging said shank and socket flanges, rollers between said races, and said preloading means comprising a ball bearing having an outer race engaging the inner wall of said socket and an inner race having screw-thread engagement with the flange of said blade.

3. A thrust bearing assembly comprising a hollow annular member having an integral in-turned flange at its end, a shaft member having an integral external flange of a size to pass said inturned flange into said annular member, a split roller race fitted around said shaft member and against the shaft flange, a string of rollers engaging said race, an external race comprising at least three segments, said segments being so dimensioned as to pass, individually, between said shaft member and the inturned flange the first and second segments being moved radially outwardly and into end abutment with each other, after insertion between said shaft member and inturned flange, to engage the inner wall of said hollow member beneath said inturned flange, opposite ends of said first two segments being circumferentially relieved in the form of steps to provide clearance for installation of the third segment therebetween after which the third segment may be moved radially outwardly and into annular alignment with the first two segments said shaft after bearing assembly, being movable axially in said annular member so that said races bear on the flanges and said rollers on the races, and means to hold said shaft in axial position in the annular member to load said bearing.

4. A propeller blade bearing and retention assembly comprising a hub including a hollow cylindrical blade socket, the outer edge of said socket being inturned toward the socket axis to comprise an integral flange, a blade having a cylindrical shank and an integral flange extending outwardly from the end of the shank, said shank flange being of a diameter to pass into the socket through the inturned socket flange and to leave an annular chamber between the cylindrical surface of the shank and the surface of the cylindrical hollow of the socket; a bearing race embracing said shank and associated with said flange, bearing balls of a diameter to pass between the cylindrical shank and the socket flange and engaged with said bearing race, and a plurality of at least three outer race segments each of a size insertable between the cylindrical shank and the socket flange and into said annular chamber, all but one of said segments being disposable after insertion outwardly against the wall of the cylindrical hollow, the ends of the inserted segments being circumferentially relieved in the form of steps to provide clearance for installing the last segment therebetween after which the last segment may be moved radially outwardly to engage the wall of the cylindrical hollow and into annular alignment with the first segments, and means engaging parts of the blade and socket to shift the blade shank axially in the socket to engage the bearing balls with the shank bearing race and with the assembled outer race segments.

References Cited in the file of this patent

UNITED STATES PATENTS

| | | |
|---|---|---|
| 2,248,590 | Smith | July 8, 1941 |
| 2,438,542 | Cushman | Mar. 30, 1948 |
| 2,476,638 | Stuart | July 19, 1949 |
| 2,515,996 | Hackethal | July 18, 1950 |
| 2,566,884 | Hackethal | Sept. 4, 1951 |

FOREIGN PATENTS

| | | |
|---|---|---|
| 486,614 | Great Britain | June 8, 1938 |
| 546,510 | Great Britain | July 16, 1942 |